United States Patent Office 3,479,818
Patented Nov. 25, 1969

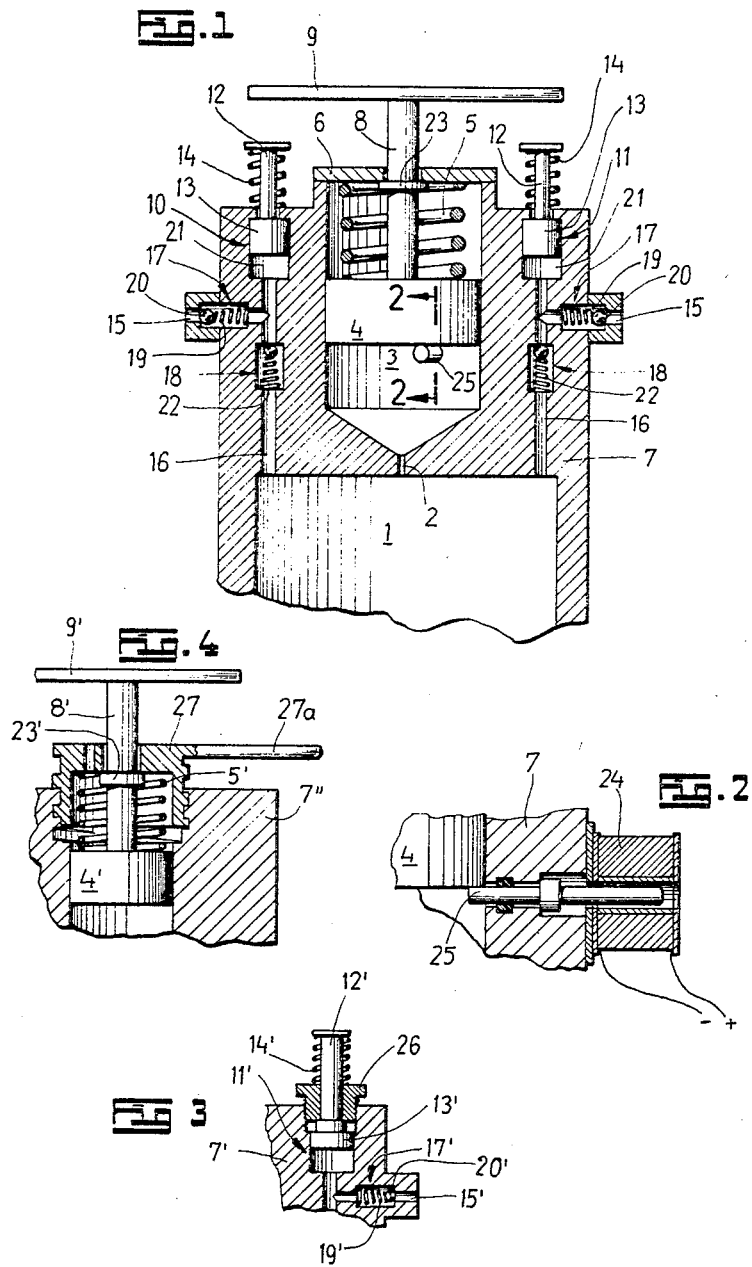

3,479,818
APPARATUS AND METHOD FOR FEEDING PULSATING FLUID PROPELLANT ROCKET ENGINES
Heinrich Strobl, Hohenkirchen, Germany, assignor to Bolkow Gesellschaft mit beschrankter Haftung, Ottobrunn, near Munich, Germany
Filed Mar. 14, 1967, Ser. No. 623,086
Claims priority, application Germany, Mar. 25, 1966, B 86,362
Int. Cl. F02g 3/00; F02k 5/02
U.S. Cl. 60—39.48      16 Claims

ABSTRACT OF THE DISCLOSURE

A method of feeding propellant to the combustion chamber of a fluid operated pulsating rocket engine using an energy operated pump and an elastic energy storing member such as a spring, comprises storing pump operating energy by using the operating pressure of the rocket engine during each high pressure phase of operation, and utilizing the stored energy during the low pressure phase of operation to drive the energy operated pump and to direct the propellant into the combustion chamber so that the cycle is repeated. The initial energy storage level of the elastic member is adjusted to vary the operating characteristics. The device for carrying out the method includes a pump having a suction connected to the propellant supply and a discharge connected to the combustion chamber. The energy storing means includes a member movable upon increase in pressure of the combustion chamber to store energy and movable in an opposite direction upon decrease in pressure of the combustion chamber to operate the pump.

---

An apparatus for carrying out the method of the invention, for example, comprises a piston member which is biased by a spring and which is arranged in a chamber which communicates with the combustion chamber so that during the high pressure combustion or decomposition stage of the cycle of operation of the engine the piston member is forced against its biasing spring to compress the latter. In this manner, the energy is stored in the spring and upon release of the pressure from the combustion chamber, the piston is moved by the spring and in so doing actuates one or more pump members which comprise reciprocating piston elements which are moved to cause the movement of the propellant into the combustion chamber and a renewal of the combustion process. In accordance with a feature of the arrangement, the piston provided for storing the energy may be locked in an actuated position by means of an electromagnetically actuated plunger which engages below the piston after the piston has been forced in a direction to compress its associated spring by the combustion gases. When the engine is started, the plunger is removed to release the piston to permit it to move and cause actuation of the fuel pumps.

In accordance with another embodiment of the invention, the stroke of the individual pumping cylinders may be varied by mounting the pistons such that they may be shifted axially in respect to their associated cylinders. This is accomplished by using a threaded head holder for the rod portion of the piston which may be threaded into the associated pump cylinder. In accordance with a further modification, the compressive force acting on a spring biasing the energy storing piston may be varied using a threaded holding member which may be threaded downwardly to change the pressure force between the spring and the associated piston.

SUMMARY OF THE INVENTION

This invention relates, in general, to a method and apparatus for supplying propellant to rocket engines and, in particular, to a new and useful device for storing energy during the combustion or decomposition phase of operation of a rocket engine and utilizing this energy in pumping the propellant to the combustion or decomposition chamber and to a method of operating a pulsating rocket engine.

Pulsating engines permit a fine thrust proportioning from brief impulse to permanent thrust. They are used chiefly for the drive and control of space missiles. With such engines, the liquid propellants are generally fed by stored compressed gas. Valves are arranged before the injection head which clear the way to the combustion chamber for a single impulse or for a succession of impulses. The feed method with stored compressed gas has the advantage that the feed energy is permanently available so that the engine can be started at any time on short notice. It has, however, the disadvantage that the entire propellant tank is under feed pressure. This feed pressure is computed from the sum of the combustion chamber pressure, the injection over-pressure, and the pressure losses of the propellant on its way from its storage tank to the combustion chamber. With a pump feed method, however, the propellant can be stored under any desired low pressure or pressure specified only by the optimum storage condition. The tanks used with a compressed gas feed method must be designed as pressure tanks, owing to which their structural weight increases considerably. The compressed gas usually stored under high pressure makes it necessary to employ additional high pressure storage containers as well as a system of lines, valves and pressure regulators, so that the structural weight of the entire feed apparatus is further increased. Especially disadvantageous is the fact that the weight of the propellant tank, a determining factor in compressed gas feed systems, as well as the weight of the compressed gas and its container, depends on the total quantity of propellant to be fed. For this reason, the feed method with stored compressed gas is limited to engines of low total propellant consumption.

For constantly burning rocket engines it is known practice to use the gas formed in the combustion chamber as a compressed gas for the feed of the propellants. With this so-called difference pressure method, as with the above-described compressed gas method, the propellant tanks must be set under feed pressure. They must therefore be designed as pressure tanks and a saving in weight and structural space results only due to the fact that a separate compressed gas and the compressed gas tanks can be omitted.

In accordance with the invention, there is provided a feed method for fluid propellants for fluid rocket engines which does not require the use of stored compressed gas and has the advantage of a permanent readiness for use on short notice. The propellant can be stored at any desired low tank pressure or a tank pressure specified by optimum storage conditions and it is fed to the combustion chamber in accordance with the invention by pumping elements which are actuated by energy which is stored during the high pressure combustion phase of the operating cycle of the rocket engine. The apparatus for such a method includes a chamber formed adjacent one end of the combustion chamber in which is positioned a piston which is biased in a direction toward the combustion chamber by a spring and which will be moved backwardly against the biasing force of the spring during the high pressure combustion or decomposition phase of operation of the engine. During the portion of the engine operating cycle at reduced pressure, the piston is moved backwardly by a spring to cause movement of one or more piston members in one or more pumps to cause the flow of the propellant into the combustion chamber which, in turn, causes the pulsation of the combustion process or the decomposition process. With such a feed method and apparatus, the propellant tanks need not be pressure tanks and only a small quantity of propellant is set under pressure during each cycle by the pumping elements. Thus, the compressed gas containers and the associated equipment may be omitted since the feed energy is generated by the combustion chamber pressure.

The inventive apparatus advantageously includes means for holding the stored energy pump actuating means in a stored energy position. In the embodiment of the invention illustrated, this comprises a plunger member which is engaged beneath the piston after it has been positioned at a location at which it compresses its associated spring such as by the operating pressure of the combustion engine. The plunger may advantageously be operated by an electromagnet to cause release of the piston and to actuate the pumping elements for the pumping of the propellant after the engine is started. In accordance with various modifications of the apparatus, the stroke of the pump piston and/or the compression of the actuating spring for the energy storing piston may be varied.

Accordingly, it is an object of the invention to provide a method of operating a fluid propellant rocket which includes storing energy during the high pressure combustion or decomposition phase of operation of the engine and utilizing the stored energy to drive pumping elements to pump the propellant into the combustion chamber during the reduction in pressure phase portion of the engine operating cycle.

A further object of the invention is to provide an apparatus for pumping a propellant into a rocket engine which includes means for storing energy in the form of a movable piston or elastic member to provide a force for actuating pumping elements for pumping propellant into the combustion chamber during the phase of reduced pressure operation thereof.

A further object of the invention is to provide a propellant delivery system for rocket engine which includes a piston energy member which is slidable in a chamber which communicates with one end of the combustion chamber of the engine and which is biased in a direction toward the combustion chamber by a spring, the piston being movable against the biasing of the spring to store energy for driving the piston in an opposite direction during the lessening pressure phase of operation of the engine and to actuate piston elements of one or more pumps for pumping propellant into the combustion chamber during this phase.

A further object of this invention is to provide an apparatus for pumping propellant to a rocket engine which includes individual piston pump elements which may be varied in stroke or in return biasing force in a simple manner.

A further object of the invention is to provide a rocket engine feed system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is an axial sectional view through a rocket engine combustion chamber constructed in accordance with the invention;

FIG. 2 is a partial sectional view taken along the line 2—2 of FIG. 1;

FIG. 3 is a partial sectional view similar to a portion of FIG. 1 of another embodiment of the invention; and FIG. 4 is a view similar to FIG. 3 of still another embodiment of the invention.

DETAILED DESCRIPTION

Referring to the drawings, in particular, the invention embodied therein as indicated in FIGS. 1 and 2 comprises a rocket engine having a decomposition or combustion chamber 1 which is connected through a throttle cross section 2 to a cylindrical space or energy storing chamber 3 in which an energy piston or control piston 4 is movably arranged. The reaction in the chamber 1 may be either a decomposition or a pronounced combustion depending upon the propellants used and whether they react together by ignition and combustion, or hypergolically by decomposition. A compression spring 5 is disposed around a piston rod 8 and compressed between a cover 6 and the piston 4 in an energy stored position, as indicated in FIG. 1.

In accordance with the invention, the housing or head portion 7 of the rocket engine is provided with a plurality of propellant pumps, in the embodiment illustrated two pumps 10 and 11, which are of a sliding piston type. The pumps 10 and 11 are driven from the stored energy means comprising the piston 4 and spring 5 by the return movement of the piston 4 under the influence of the spring 5 when the pressure in the combustion chamber 1 has been reduced after a combustion or decomposition has taken place. For this purpose, the rod 8 of the piston 4 carries a cross member or tappet 9 which engages associated pump stems or rod portions 12, 12 of the piston pumps 10 and 11. The movement of the tappet 9 along with the piston 4 upwardly in the energy chamber 3 causes upward movement of the associated pistons 13, 13 of the pumps 10 and 11 to effect a low pressure in the chamber 21 and an inflow of propellant through associated lines 15, 15 which are connected to respective propellant tanks (not shown). Compression springs 14 disposed around the valve stems 12 and engaged on the top of the rocket housing 7 insure a positive connection between the stems 12 and the tappet plate 9.

Pressure reduction in the combustion chamber 1 causes downward movement of the piston 4 and associated pistons 13, 13 of the pumps 10 and 11. Consequently pressure build-up in the pump discharge 21 effects closing of inlet valves 17, 17 and opening of outlet valves 18, 18 thus admitting propellant to the combustion chamber 1. The outlet valve 18 includes a compression spring 22 which biases the associated ball check element upwardly to close off the outlet passage when the piston 13 is not being moved through a pumping cycle. The spring 19 of the inlet valve is so dimensioned that the ball 20 lifts during a suction cycle of the pump piston under the action of the difference of pressure between the tank (not shown) and the pump cylinder 21. In the same manner, the spring 22 of the outlet valve 18 is adjusted to the injection overpressure of the propellant.

The control piston 4 is moved under the action of a combustion chamber pressure from a starting position into the indicated position at which it compresses the spring 5 and it may be anchored in this position or locked in this position by means of a locking device including a plunger or bolt 25 which is actuated by an electromagnet 24. The stored energy or locked position of the piston 4 is fixed by a stop ring 23 which engages against the cover 6. When the bolt member 25 is removed upon actuation of the solenoid 24, from a blocking position, the piston 4 returns toward the combustion chamber 1 under the biasing force of the spring 5 to cause the tappet 9 to engage the pumping elements 10 and 11 and cause pumping of the propellant into the combustion chamber. The pump pistons 13 under the control of the piston 4 acting through the tappet 9 execute a suction cycle and an injection cycle and the movements of the control piston 4 and the pump piston 13 repeat with every pressure cycle.

Before the engine is started up, the control piston 4 can be pushed into its end position, for example, manually, and locked there by means of bolt 25. In this locked position, the spring 5 is compressed and the piston pumps 10 and 11 have completed their suction cycle. The engine is then ready for take-off and can be started by removing the bolt 25.

The quantity of propellant delivered by the propellant pumps 10 and 11 per pressure pulse is governed by their stroke volume. In FIG. 3, there is indicated a means for varying the stroke volume. In this embodiment, a threaded ring 26 engages around the stem 12' and it is provided with external threads for threading into internal threads defined in the housing 7'. The amount that the ring 26 is threaded into the bore of the housing 7 determines the length of the stroke of the piston 13' and hence the quantity of propellant which is injected by movement of the piston 13'.

In the embodiment of FIG. 4, there is indicated a means for varying the tension of the compression spring 5' for a control or energy storing piston 4'. In this embodiment, a piston rod 8' is provided with a collar 23' which limits the upward movement of the control piston 4' as in the other embodiment. Instead of a cover, as in the embodiment of FIG. 1, there is provided a cap screw 27 which is threaded into the top of the housing 7" and which is provided with a handle projection 27a to permit the cap screw to be threaded by a selected amount into the receiving threaded bore of the housing. Depending on the amount of threading of the cap screw 27 into the housing, the stored energy compression of the spring 5' may be varied. By the initial tensioning of the spring member, the spring characteristic, and hence the pulse frequency, can be controlled according to a further feature of the invention, and this corresponds to a thrust modulation.

A further characteristic of the invention is that the inlet and outlet valves for the propellant are check valves which are controlled by the difference in pressure between the pump cylinder and the propellant tank (not shown) or between the pump cylinder and the combustion chamber. They may be adjusted to certain operation pressures by adjusting the springs in the known manner.

The locking apparatus which in the embodiment of the invention illustrated in FIGS. 1 and 2 comprises the bolt member 25 which is actuated by the electromagnet 24 may be of any kind, for example, hydraulic, electromagnetic or mechanical. Since with every injection cycle a new ignition must take place, hypergolic propellant combinations or catalytically decomposing propellants are particularly suitable for the method of the invention. In principle, however, it is possible to apply the method also for other propellants of a continuous ignition system or one controlled periodically by the feed device itself. The pulse frequency of the engine may be increased by increasing the initial tension of the energy storing device such as the spring 5.

While specific embodiments of the invention have been shown and described in detail to illustrate the application of the inventive principles, it will be understood that the invention may be embodied otherwise without departing from such principles. For example, instead of energy storing piston and pumping pistons of the embodiment described diaphragms or bellows may be used as well.

What is claimed is:

1. A method of feeding propellant to the combustion chamber of a fluid operated pulsating rocket engine using an energy operated pump and an elastic energy storing member such as a spring, comprising storing pump operating energy by using the operating pressure of the rocket engine during each high pressure phase of operation, utilizing the stored energy during the low pressure phase of operation to drive the energy operated pump to direct propellant into the combustion chamber so that the cycle is repeated, and adjusting the initial energy storage level of the elastic member to vary the operating characteristics.

2. A device for feeding propellant from a supply tank to a fluid-operated combustion chamber of a rocket engine comprising a combustion chamber for said rocket engine, a pump having a suction adapted to be connected to the propellant supply tank and having a discharge connected to said combustion chamber, said pump having a movable pump element displaceable to pump propellant from the supply tank to said combustion chamber, and energy storing means connected with said combustion chamber and having a member movable upon increase in pressure of said combustion chamber to store energy and movable in an opposite direction upon decrease in pressure of said combustion chamber to contact said movable pump element and to displace said pump element to pump propellant into said combustion chamber.

3. A device according to claim 2, including means for locking said energy storing means in a position at which it is storing energy.

4. A device according to claim 2, wherein said pump element comprises a displaceable piston, and means for varying the stroke of said piston.

5. A device according to claim 2, wherein said energy storing means comprises a control piston and a spring engaged with said piston and being compressible thereby upon movement of said piston in response to increase in pressure of said combustion chamber.

6. A device for feeding fluid propellant to a fluid-operated combustion chamber of a rocket, comprising wall means for defining a chamber for the reaction of a propellant, an energy storing chamber communicating with said combustion chamber, a control piston movable in said energy storing chamber, means biasing said control piston in one direction, said piston being exposed to the pressure of said combustion chamber and being movable by the combustion chamber pressure in an opposite direction during the reaction process at which the pressure in said chamber increases, a pump having a suction adapted to be connected to a propellant supply and having a discharge connected to said combustion chamber and including a movable pump piston displaceable to pump propellant from the supply to the combustion chamber, said control piston being movable by said biasing means to cause displacement of said pump piston and pumping of propellant into the combustion chamber.

7. A device according to claim 6, wherein said pump section includes a suction valve having a valve element closing the passage for the propellant therein and spring means biasing said valve element to a closed position, said valve element being movable against said spring biasing means to permit inflow of propellant, said pump having a discharge valve in said discharge including a discharge valve member closing said discharge and a discharge spring member biasing said discharge valve member to close said discharge, said discharge valve member being movable against its associated spring upon the pressure in the pump discharge exceeding an injection pressure for the propellant into said combustion chamber.

8. A device according to claim 6, including means for varying the stroke of said control piston.

9. A device according to claim 8, wherein said means for varying said control piston stroke comprises a threaded sleeve member engageable in said wall means defining said combustion chamber and carrying said piston, said threaded sleeve member being threadable to change the initial position of said piston for varying the stroke thereof.

10. A device according to claim 6, including means engageable with said control piston for holding said control piston in an energy storing position.

11. A device according to claim 10, wherein said means for holding said control piston in an energy storing position includes a bolt member which is displaceable into the path of said piston, and electromagnetic means for actuating said bolt member.

12. A device according to claim 6, including means for varying the biasing force on said control piston.

13. A device according to claim 12, wherein said biasing means includes a compression spring disposed between one end of said control chamber and said piston and adjustable means defining the end of their control chamber which may be varied to vary the compression force on said spring.

14. A device according to claim 6, wherein said control chamber is connected to said combustion chamber through a passage of reduced flow area, said piston having a piston rod having a tappet plate connected thereto which is engageable with said pump piston upon movement of said control piston.

15. A device according to claim 6, wherein said biasing means comprises a mechanical spring.

16. A method according to claim 6, including varying the delivery stroke of the energy-operated pump for varying the quantity of fuel which is delivered during each cycle.

References Cited

UNITED STATES PATENTS

| | | | |
|---|---|---|---|
| 916,726 | 3/1909 | Lake | 60—247 |
| 2,536,597 | 1/1951 | Goddard | 60—247 |
| 2,765,618 | 10/1956 | Houle | 60—247 |
| 2,796,058 | 6/1957 | Perkins | 123—139.9 |
| 3,048,969 | 8/1962 | Horner | 60—247 |
| 3,279,179 | 10/1966 | Kemenczky | 60—247 |

CARLTON R. CROYLE, Primary Examiner

DOUGLAS HART, Assistant Examiner

U.S. Cl. X.R.

60—39.76, 247, 259